Sept. 5, 1933.  C. W. LEGUILLON  1,925,901
PROTECTIVE SHEATH FOR HOSE
Filed April 2, 1931
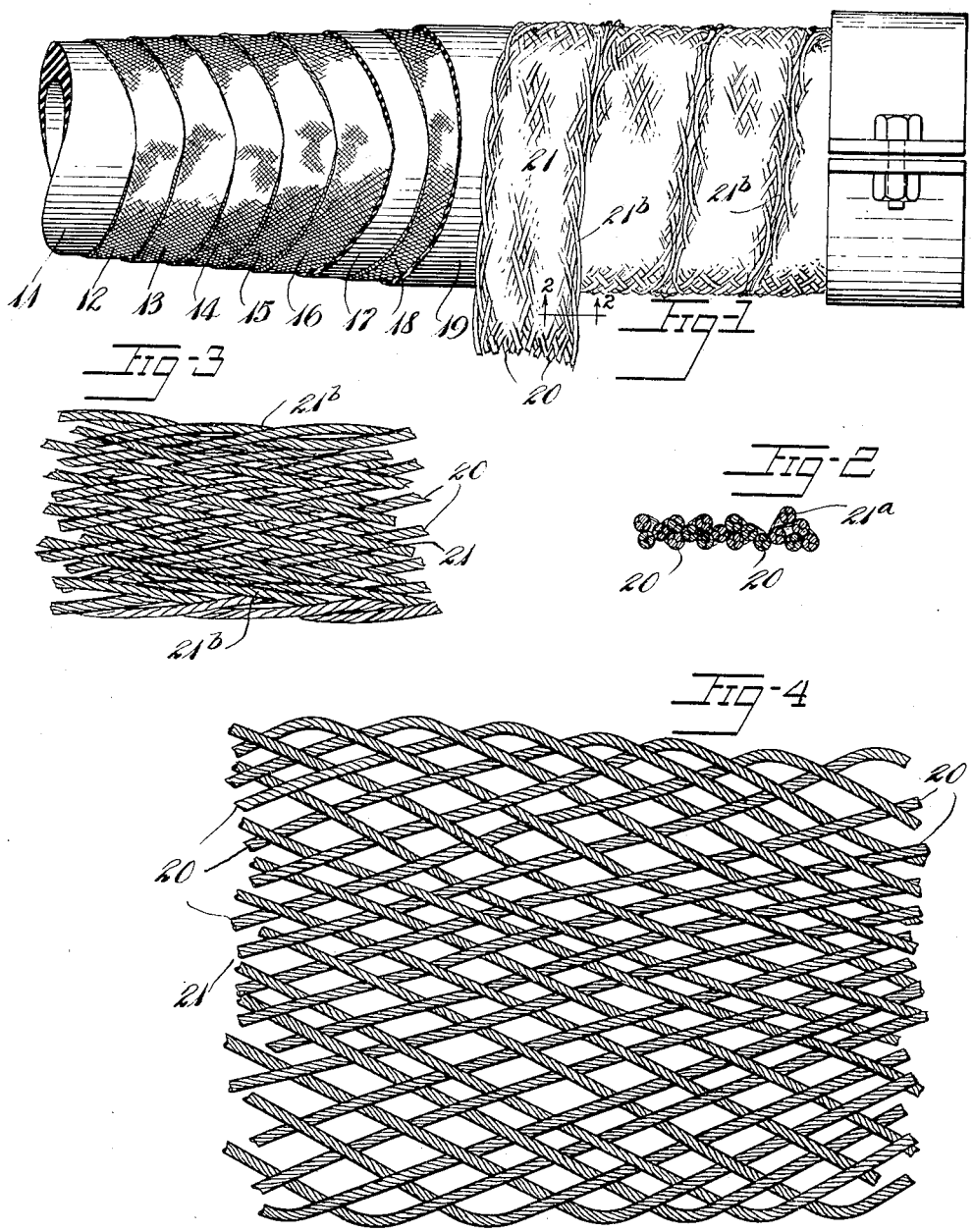
Inventor
Charles W. Leguillon
By Eakin & Avery
Attys.

Patented Sept. 5, 1933

1,925,901

UNITED STATES PATENT OFFICE 1,925,901

PROTECTIVE SHEATH FOR HOSE

Charles W. Leguillon, Akron, Ohio, assignor to The B. F. Goodrich Company, New York, N. Y., a corporation of New York Application April 2, 1931. Serial No. 527,319

2 Claims. (Cl. 137—90)

My invention relates to a protective sheath for hose and more specifically to a protective sheath for large size hose of the type used in well-drilling and similar operations where the outer cover thereof is subjected to great abrasive wear.

Heretofore in the manufacture of hose of large internal bore adapted for the rapid conveyance of fluid and semi-fluid materials it has been customary to provide an outer sheath or cover made by helically wrapping rope around the hose. Such types of covering when subjected to abrasive wear, caused by dragging of the heavy hose over the ground, failed by cutting of the cover at one point and consequent unwrapping of the entire cover.

The objects of this invention are to provide a rope covering for such hose which will not unwrap when a single rope in the cover becomes cut, to provide better protection against abrasion, and to provide a structure that may be easily applied to the hose.

Other objects of the invention will appear from the following description of the invention and the accompanying drawing.

In the drawing, Fig. 1 is an elevation of a section of hose with the cover of my invention partially applied thereto, parts of the hose structure being broken away to show its construction.

Fig. 2 is a cross-sectional view of the rope wrapping employed in covering the hose.

Fig. 3 is an elevation of such a wrapping element in the condition in which it is applied to the hose, and Fig. 4 is a similar view showing the wrapping element expanded in width.

Referring to the drawing, Fig. 1 shows a section of hose, which may be of any desired construction, but which preferably consists of a rubber inner layer 11, layers of reinforcing material 12, 13, 14, 15, 16, 17 and 18, formed of rubberized fabric or other material, and a rubber outer cover 19. It will be understood that the object of the inner layer 11 is to form a leak proof lining for conducting the fluid and to provide an inner surface which is not rapidly deteriorated by abrasion of the conducted materials, the layers 12 to 18 inclusive are to provide strength and flexibility, and the outer layer 19 is to provide a fluid-resisting protective layer for the reinforcing elements. Such a layer, while ordinarily moisture proof and resistant to ordinary abrasion, is not suited to resist abrasive wear such as occurs where very heavy hose of large cross-section is used in construction, mining, oil drilling, shipping, and similar operations, where the hose is subjected to abuse in being dragged over the rocks, structural iron works, docks, and the like, and a single opening in the cover 19 will admit moisture and oils which rapidly deteriorate the reinforcing elements.

In order to protect the hose from such abrasive injury I provide a protective sheath therefor formed of rope elements 20 plaited or braided to form a wide band 21 such as is illustrated in Fig. 4. I then apply the band 21 under tension to the hose 10 as a helical winding thereon to form a protective sheath therefor, as shown in Fig. 1. The tension applied to the plaited band 21 reduces its width as shown in Fig. 3 and increases the thickness of its lateral margins as seen in Fig. 2 at 21a. This provides a helical ridge 21b of increased thickness extending throughout the sheath. The wrapping of the hose may be done after vulcanization of the hose is complete and the ends of the wrapping may be fastened thereto in any desired manner, as by clamping members 22 or by anchoring at the coupling members.

A sheath prepared according to this invention may be easily manufactured. The plaiting of the ropes may be done either by hand or by the use of braiding machines of known type and the wrapping of the hose may be done at any time during or after the manufacture of the hose. Due to the width of the band 21 a section of hose may be quickly and easily sheathed even when done in the field as less convolutions are necessary than where the hose is wrapped with a single strand. Abrasion of the sheath causing the cutting of a single strand of rope will not allow the band 21 to unwind as the plaiting of the rope elements interlocks them with the other elements throughout their length.

The thickened ridges 21a formed on the margins of the band 21 provide further cushioning adjacent the margins of the helical wrappings and protects the strands at the center of the band so that cutting of the entire band at one place does not occur.

In describing the elements 20 as rope elements I wish to include not only elements formed of twisted vegetable fibers but also to include strands of metallic wire or of wire cable or other flexible elements and combinations of such elements.

I claim:

1. The combination with a flexible fluid conduit member of a protective member therefor comprising a helical winding of plaited rope elements so associated as to provide a flat strip having a margin substantially thicker than the body of the strip.

2. A reinforced flexible tube, including, a tube and an expansible flat tape made of wires braided together, said tape being wound around the tube in physical contact therewith with at least portions of the edges of adjacent windings in contact, the wires of said tape being braided so that each wire is interlaced with the other wires back and forth from one margin of the tape to the other.

CHARLES W. LEGUILLON.